No. 754,313. PATENTED MAR. 8, 1904.
E. A. IVATTS.
PHONOGRAPH, &c.
APPLICATION FILED MAY 20, 1903.
NO MODEL.

WITNESSES
Thos. Howe
Richard H. Tucker

INVENTOR
Ernest A. Ivatts

No. 754,313.

Patented March 8, 1904.

UNITED STATES PATENT OFFICE.

ERNEST ALBERT IVATTS, OF PARIS, FRANCE, ASSIGNOR TO COMPAGNIE GÉNÉRALE DE PHONOGRAPHES, CINÉMATOGRAPHES ET APPAREILS DE PRÉCISION, OF PARIS, FRANCE.

PHONOGRAPH, &c.

SPECIFICATION forming part of Letters Patent No. 754,313, dated March 8, 1904.

Application filed May 20, 1903. Serial No. 158,028. (No model.)

*To all whom it may concern:*

Be it known that I, ERNEST ALBERT IVATTS, a citizen of Great Britain, residing at Paris, in the Department of the Seine, France, have invented new and useful Improvements in and Relating to Phonographs and the Like, of which the following is a specification.

In phonographs with cylindrical records the records are generally fitted upon a conical mandrel. These records thus possess conical bores and are secured upon the conical mandrels by wedging. This method of fixing the records has the advantage that a great number of records may be used in connection with the same apparatus, but cannot be used with records of equal thickness throughout—that is, records with a cylindrical central bore.

This invention relates to an expansible inner sleeve for securing cylindrical records of phonographs in place upon the conical mandrel generally provided for this purpose. These records are of equal thickness throughout—that is, they are cylindrical inside as well as outside.

Figure 1:
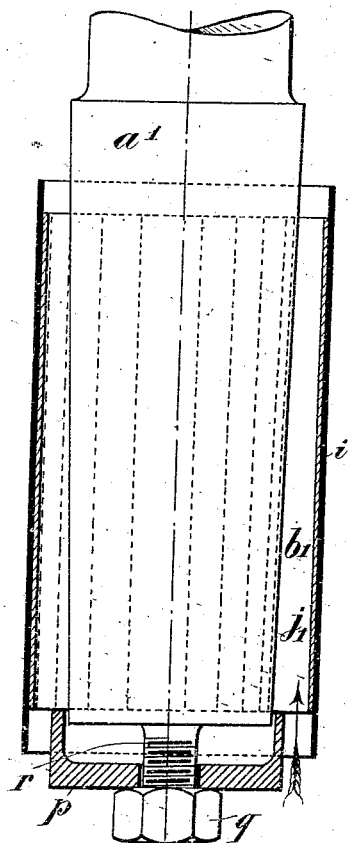
Figure 3:
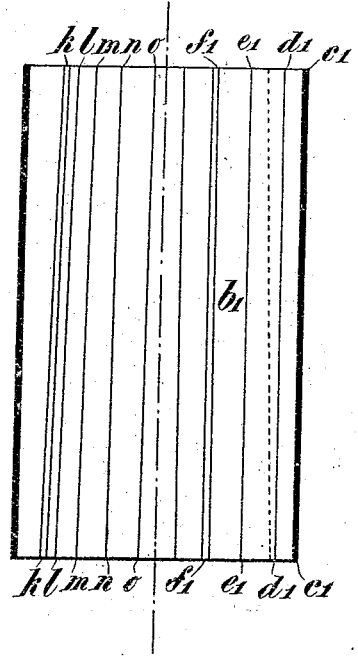
Figure 2:
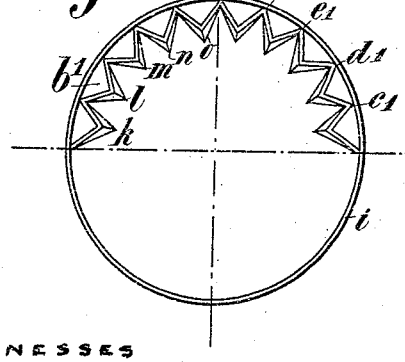
Figure 4:
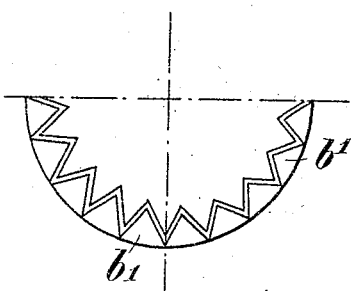

In the accompanying drawings, Figure 1 is a sectional elevation of a conical mandrel, expansible sleeve, and cylindrical record. Fig. 2 is an end view of the record and one-half of the sleeve. Fig. 3 is a longitudinal sectional elevation of the sleeve. Fig. 4 is a half end view of the same.

In Fig. 1, $a'$ is the central conical mandrel or plug of the phonograph or a piece mounted upon a rotating shaft. $b'$ is the expansible integral sleeve with corrugations or grooves, which are produced by creasing or bending the tube in such a manner that the surfaces or outer edges of the ridges $c'\ d'\ e'\ f'\text{-}g'\ h'$ are in or come against a cylindrical internal surface, while the inner or outer edges of the ridges $k\ l\ m\ n\ o$ are formed to engage with an external conical surface. The record $i$ is placed upon the sleeve $b'$, which is then pushed upon the conical mandrel $a'$ in the direction of the arrow $j''$, the creased or corrugated surfaces being thus subjected to deformation in respect of height and width, the outer edges of the ridges being firmly pressed against the inner face of the record, and the inner edges of the ridges tightly embracing the conical surface of the mandrel. In Fig. 1, $p$ is a cup-shaped disk by means of which the sleeve $b'$ is pushed onto the cone $a'$ by the agency of the nut $q$ engaging with a screw $r$, forming a central extension of the mandrel $a'$. I do not limit myself to the employment of this expansible sleeve only for the purpose of fixing the record in place, but reserve the right to use it in any other manner—as, for example, for securing the records during the process of manufacture when they are undergoing polishing and turning.

The sleeve, as described, may be formed from any suitable material, and the ridges or corrugations may be pointed, rounded, or flat and of any suitable dimensions.

Having now particularly described and ascertained the nature of my said invention and in what manner the same is to be performed, I declare that what I claim is—

1. An expansible sleeve having longitudinal corrugations whose outer edges lie in a cylindrical plane, so as to engage with the inner surface of a cylindrical record, and whose inner edges lie in a conical plane, corresponding with and adapted to engage the external conical surface of the ordinary phonograph-mandrel.

2. The combination with a phonograph-mandrel having the usual conical taper, of a record having a cylindrical interior, and an expansible integral sleeve having a corrugated surface and adapted to be slid lengthwise into the annular space between the mandrel and the record, and firmly support the latter.

In testimony whereof I have signed my name to this specification in the presence of two subscribing witnesses.

ERNEST ALBERT IVATTS.

Witnesses:
 AUGUSTUS E. INGRAM,
 HENRY DORNLEY.